United States Patent [19] [11] Patent Number: 4,690,666
Alexander et al. [45] Date of Patent: Sep. 1, 1987

[54] TRAY-FORMING APPARATUS

[75] Inventors: Garold W. Alexander, Noblesville; Lonnie E. Hyder, Huntington, both of Ind.; Robert V. Wright, Strongsville, Ohio

[73] Assignees: Peerless Machine & Tool Corporation, Marion, Ind.; Champion International Corporation, Stamford, Conn.

[21] Appl. No.: 903,961

[22] Filed: Sep. 5, 1986

[51] Int. Cl.⁴ ............... B29C 51/20; B29C 55/02
[52] U.S. Cl. ............................. 493/152; 425/155; 425/394; 425/398; 425/412
[58] Field of Search ............... 425/383, 394, 398, 406, 425/412, 419, 299, 150, 167, 155; 493/152, 158, 162, 167, 171, 174, 338, 395, 902

[56] References Cited

U.S. PATENT DOCUMENTS 4,149,841 4/1979 Patterson ................ 425/398
4,246,223 1/1981 Patterson ................ 264/292
4,514,353 4/1985 Alexander et al. ........... 264/294

Primary Examiner—Willard E. Hoag
Attorney, Agent, or Firm—Barnes & Thornburg

[57] ABSTRACT

A die set is provided for forming a multi-compartmented tray from sheet material. The die set includes a female die assembly formed to include at least two mold cavities and a drawing surface bounding said mold cavities, a first compartment-former for pressing sheet material into a selected mold cavity to form a compartment therein, a second compartment-former for pressing sheet material into the remaining mold cavities to form compartments therein, and a draw ring for holding sheet material against the drawing surface during movement of the first and second compartment-formers into their respective mold cavities. The first compartment-former includes a first die for pre-forming the compartment, a second die for finish-forming the compartment, and a projection system for moving the first die relative to the second die in a direction toward the cavity to a leading position. A control system is also provided for disabling the projection system at a predetermined position of the first die in the cavity to permit relative movement between the first and second dies during finish-forming of the tray compartment. Such relative movement allows the first die to relinquish its leading position as the second die finish-forms the tray compartment to relieve pressure applied to sheet material at a predetermined stage of each molding cycle so that sheet material is able to flow within the selected mold cavity during the drawing process.

23 Claims, 4 Drawing Figures

U.S. Patent   Sep. 1, 1987   4,690,666
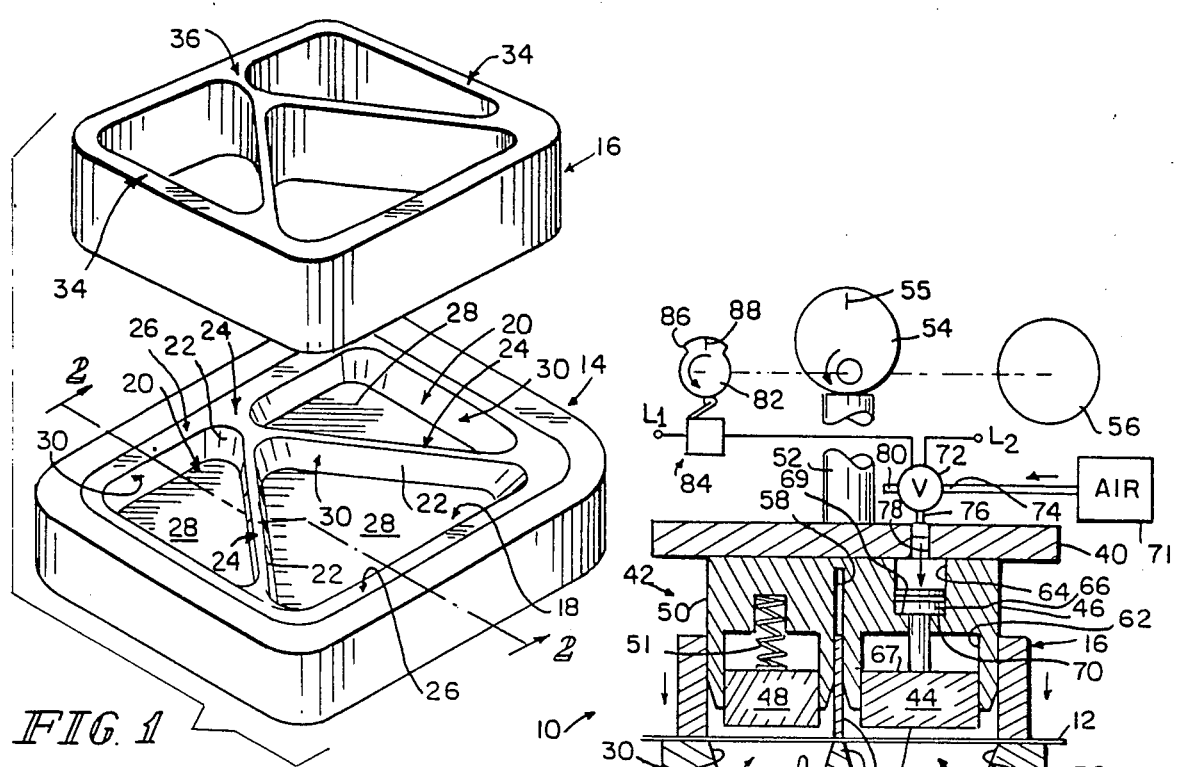
FIG. 1
FIG. 2
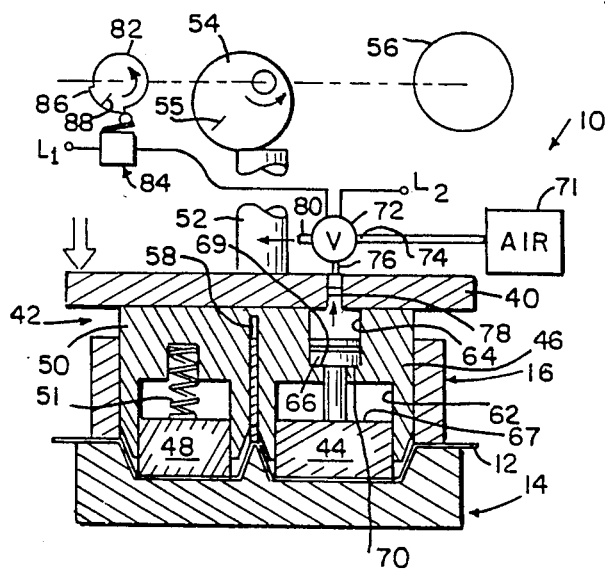
FIG. 3
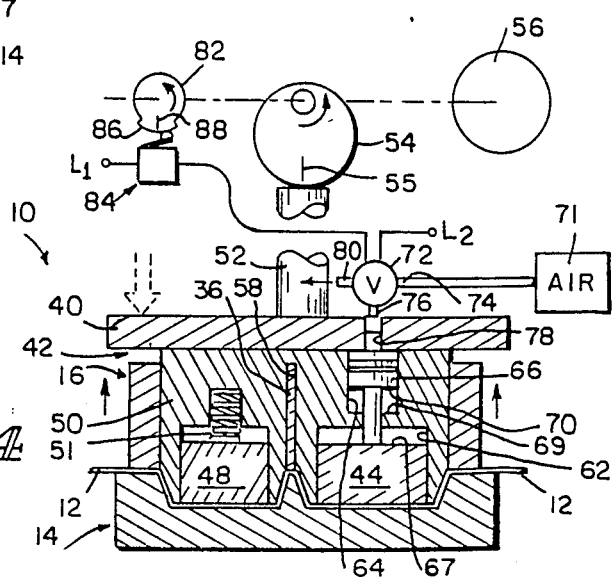
FIG. 4

TRAY-FORMING APPARATUS

BACKGROUND AND SUMMARY OF THE INVENTION

This invention relates to an apparatus and method for deep-drawing a compartment tray having ridges separating the various compartments from paperboard stock. More particularly, this invention relates to the formation of a selected compartment of a multi-compartmented tray using a male pre-forming die and a separate male finish-forming die.

In the art of constructing multi-compartmented trays by drawing paperboard or the like in a press, it has been difficult to draw trays without tearing, rupturing, or otherwise damaging the interior walls of the tray compartments and the common regions interconnecting adjacent tray compartments. One cause of this manufacturing problem is the inability of paperboard captured between a male die and an interior wall of a female mold cavity during an initial stage of a compartment-forming sequence to flow along the interior wall during subsequent drawing operations. While the paperboard forming the bottom wall of the tray compartment is substantially unaffected or unstressed by the drawing operations, the paperboard used to form the tray compartment side walls is held under a predetermined tension during the drawing process. Occasionally, certain portions of this taut drawn paperboard are stretched beyond the elastic limit of the paperboard material during drawing operations resulting in paper rupture or tearing.

One object of the present invention is to provide a die system for varying the pressure applied to paperboard advanced into a mold cavity during a molding cycle so that paperboard is allowed to flow in the mold cavity sufficiently to relieve stress concentrations developed in the paperboard during paperboard drawing operations associated with the molding cycle.

Another object of the present invention is to provide a die system for distributing paperboard that has been pre-loaded into a selected mold cavity of a female die assembly along an interior wall of the cavity toward paperboard drawing regions of the female die assembly adjacent to the cavity as additional paperboard is being drawn into the cavity under tension. Such distribution advantageously acts to augment or bolster the supply of paperboard material in stress regions that would otherwise be stretched beyond their elastic limit during drawing operations, thereby reducing the likelihood of paper rupture or tearing in those stress regions.

Yet another object of the present invention is to provide a die system including a male die assembly having a pre-forming die that is operable to allow substantially free flow of paperboard material between the pre-forming die and the interior walls of a selected mold cavity formed in a companion female die during paperboard drawing operations associated with finish-forming a tray compartment in the selected mold cavity using a separate finish-forming die.

According to the present invention, an improved die set is provided for forming a multi-compartmented tray from sheet material. The die set includes a female die assembly formed to include at least two mold cavities and a drawing surface bounding said mold cavities, first compartment-former means for pressing sheet material into a selected mold cavity to form a compartment therein, second compartment-former means for pressing sheet material into the remaining mold cavities to form compartments therein, and draw ring means for holding sheet material against the drawing surface during movement of the first and second compartment-former means into their respective mold cavities. The drawing surface provides common drawing regions between each adjacent pair of mold cavities. The draw ring means advantageously acts to provide predetermined tension on the sheet material to reduce the degree of wrinkling of the drawn sheet material substantially.

The first compartment-former means operates to relieve pressure applied to sheet material at a predetermined stage of each molding cycle so that sheet material is able to flow within the selected mold cavity during the drawing process. Such relief aids in reducing the incidence of paper rupture and tearing in the sheet material that might otherwise occur while forming a tray compartment in that cavity.

The first compartment-former means includes a first die for pre-forming the compartment, a second die for finish-forming the compartment, and projection means for moving the first die relative to the second die in a direction toward the cavity from an initial position to a pre-forming position. In such a projected pre-forming position, the first die leads the second die into the cavity to advance sheet material into the mold cavity, thereby pre-forming the tray compartment.

Control means is also provided for disabling the projection means at a predetermined position of the first die in the cavity to permit relative movement between the leading first die and the trailing second die during finish-forming of the tray compartment. Such relative movement allows the first die to relinquish its leading position as the second die finish-forms the tray compartment so that the projection means does not act to apply pressure to sheet material during drawing operations associated with finish-forming of the tray compartment.

In preferred embodiments of the present invention, the second die is formed to include a pressurizable piston chamber. The projection means includes means for pressurizing the piston chamber and piston means for using pressure in excess of a predetermined amount in the piston chamber to apply a predetermined force to the first die. This predetermined force acts to move the first die in relation to the second die to its projected pre-forming position.

In addition, the control means includes position-sensing means for indicating when the leading first die reaches the floor of the mold cavity to define the predetermined position of the first die. The control means also includes valve means responsive to the position-sensing means for venting the piston chamber to reduce the pressure therein below a threshold amount upon arrival of the first die at the predetermined position to permit relative movement between the first and second dies.

In operation, the control means acts to release pressure exerted by the piston means on sheet material trapped between the first die and the floor of the mold cavity so that the only force effectively bearing on the sheet material after disablement of the projection means is the weight of the first die itself. This pressure-release feature advantageously allows sheet material underneath the first die to flow between the first die and the floor of the mold cavity without significantly weakening or otherwise substantially thinning the bottom wall of the tray compartment formed in the mold cavity.

Thus, sheet material already in the mold cavity as a result of the pre-forming step carried out using the first die is allowed to flow toward the drawing surface of the female die assembly as new sheet material is drawn into the mold cavity during a subsequent finish-forming step carried out using the second die. Such flow distributes sheet material within the mold cavity to regions experiencing high stress during the drawing process. Such distribution advantageously reduces the likelihood that those highly stressed portions of the sheet material will be stretched beyond elastic limit of the sheet material during formation of a tray compartment in the selected mold cavity. The incidence of sheet material rupturing and tearing is advantageously reduced by use of the novel pressure relief die system in comparison to the amount of damage during compartment formation which occurs using known die systems.

Additional objects, features, and advantages of the invention will become apparent to those skilled in the art upon consideration of the following detailed description of preferred embodiments exemplifying the best mode of carrying out the invention as presently perceived.

BRIEF DESCRIPTION OF THE DRAWINGS

The detailed description particularly refers to the accompanying figures in which:

FIG. 1 is a perspective view of a female die having a drawing surface surrounding each mold cavity and a companion draw ring for holding sheet material against the drawing surface of the female die during formation of a multi-compartmented tray therein;

FIG. 2 is a diagrammatic view of a preferred embodiment of the present invention showing sheet material being held against the drawing surface of the female die assembly by the draw ring prior to engagement of a male die assembly with the female die assembly;

FIG. 3 is a view similar to that of FIG. 2 showing a pre-forming stage of compartment formation; and FIG. 4 is a view similar to that of FIGS. 2 and 3 showing a subsequent finish-forming stage of container formation.

DETAILED DESCRIPTION OF THE DRAWINGS

The press die apparatus 10 diagrammatically illustrated in FIGS. 2-4 is used to convert a pre-scored blank 12 of paperboard material or the like into a multi-compartmented tray. One advantage of apparatus 10 is that each tray compartment is substantially simultaneously pre-formed and then substantially simultaneously finish-formed using a two-stage male die assembly without rupturing or otherwise tearing the blank 12.

The apparatus 10 includes a female die 14 and a draw ring 16 best seen in FIG. 1. The female die 14 includes a large mold cavity 18, a pair of small mold cavities 20, and upstanding ridges 22 which provide a web separating adjacent mold cavities 18, 20. Each ridge 22 provides an outer surface 24 facing draw ring 16. A border surface 28 surrounds all of the mold cavities 18, 20 and also faces draw ring 16. The female die 14 provides a drawing surface comprising outer surface 24 and border surface 26. Each mold cavity 18, 20 further includes a floor 28 and a continuous side wall 30.

The draw ring 16 is movable in relation to female die 14 in a conventional way and acts to clamp blank 12 against the drawing surface of female die 14 during compartment-forming operations. The draw ring 16 provides a predetermined tension on blank 12 in regions surrounding each mold cavity 18, 20 so as to reduce wrinkling of the drawn multi-compartmented tray. As best seen in FIG. 1, draw ring 18 includes an outer ring 34 for mating with the opposing border surface 26 and an inner web 36 for mating with the opposing outer surfaces 24. The clamping surfaces of the outer ring 34 and inner web 36 engage the complementary drawing surfaces 24, 26 when the draw ring 16 is loaded to its blank-engaging position illustrated in FIGS. 2-4. It will be understood that draw ring 16 can be driven independently using a variety of known means (not shown), including, but not limited to, a gravity-feed system, a pre-loaded spring system, a hydraulic system, or a pneumatic system, etc. . . . Reference is hereby made to U.S. Pat. Nos. 4,149,841 and 4,246,223 to Patterson for a description of one such known drive system.

Referring now to the diagrammatic illustration of die 10 in FIGS. 2-4, a press platen 40 is provided for supporting a male die assembly 42. The male die assembly 42 includes first and second dies 44 and 46, respectively, for cooperatively forming a compartment in the large mold cavity 18 and separate sets of third and fourth dies 48 and 50, respectively, for cooperatively forming a compartment in each of the small mold cavities 20. Each third die 48 is coupled to its companion fourth die 50 by connecting spring means 51.

The press platen 40 includes cam follower means such as ram 52 for reciprocating the male die assembly 42 during a molding cycle in response to rotation of eccentrically mounted drive cam 54. Drive cam 54 includes top center mark 55 and is rotated using motor 56 in a manner that is well known in the art. The male die assembly 42 is formed to include a recess 58 for slidably receiving inner web 36 of draw ring 18 during reciprocating movement relative to the draw ring 16.

A projection system is coupled to the second die 46 as diagrammatically shown in FIGS. 2-4. This system controls relative movement and position of the first and second dies 44, 46 during each mold cycle to minimize tearing of blank 12 during the drawing process. The second die 46 is formed to include a downwardly opening die chamber 62 for slidably receiving first die 44 and a concentrically aligned cylinder bore 64 in communication with die chamber 62. Bore 64 slidably receives a piston 66 that is attached to a top wall 67 of the first die 44. The first die 44 is mounted in die chamber 62 to position its bottom wall 68 in confronting relation to the large mold cavity 18.

Stop means is provided for interconnecting the second die 46 and piston 66 to suspend the piston 66 in the depending position illustrated in FIG. 2, thereby limiting movement of the piston 66 away from the second die 46. The stop means is diagrammatically represented by a radially inwardly-extending flange 69 on second die 46 and a radially outwardly-extending lip 70 on the top portion of piston 66. It will be appreciated that means for limiting relative movement of two adjacent elements can be accomplished using a variety of conventional techniques.

The projection system further includes pressurized air supply means 71, a solenoid valve 72 having an inlet 74 connected to the pressurized air supply means 71, a first discharge outlet 76 coupled to cylinder bore 64 via orifice 76 formed in press platen 40, and a second discharge outlet 80 for discharging pressurized air to the atmosphere. The solenoid valve 72 is selectively actuable to conduct pressurized air along either of two paths. In one case, valve 72 acts to permit pressurized air generated by air supply means 71 to be introduced into cylinder bore 64 via a first path established by the first discharge outlet 76 and orifice 78 to apply a predetermined piston-biasing force to move piston 66 to a first die-projecting position as shown in FIG. 2. In another case, valve 72 acts to permit pressure in cylinder bore 64 to be discharged to the atmosphere via a second path established by orifice 78 and second discharge outlet 80 to release the piston-biasing force as shown in FIGS. 3 and 4.

The pressure level in cylinder bore 64 is selected so that the piston-biasing force generated by pressure in cylinder bore 64 will maintain the first die 44 in a fixed projected position relative to the second die 46 during initial deformation of blank 12 as shown in FIGS. 2 and 3. However, the first die 44 will once again be free to move relative to the second die 48 as soon as the valve 72 is actuated to depressurize the cylinder bore 64 by venting the pressurized air therein into the atmosphere as shown in FIG. 4.

A control system is provided to actuate valve 72 at a predetermined position of first die 44 in the large mold cavity 18 as diagrammatically shown in FIGS. 2-4. This system releases the piston-biasing forces generated in cylinder bore 64 and exerted on the first die 44 as soon as the first die 44 bottoms out on floor 28 of cavity 18 to permit the flow of sheet material trapped therebetween toward drawing surfaces 24, 26.

In the illustrated embodiment, the control system includes an industrial timer cam 82 and limit switch means 84 coupled to valve 72. Timer cam 82 includes a cam lobe 86 having a timing mark 88. Timer cam 82 is coupled to drive cam 54 for rotation therewith in the conventional way. Cam lobe 86 is configured to activate limit switch means 84 upon arrival of first die 44 on the floor 28 of mold cavity 18 as shown in FIG. 3, or at some other predetermined position, causing limit switch means 84 to provide an actuation instruction to valve 72 so that pressure in cylinder bore 64 is vented to the atmosphere via orifice 78, valve 72, and second discharge outlet 80.

In operation, the relative movement of first and second dies 44, 46 is controlled by timer cam 82 and vent valve 72 to vary the pressure applied to blank 12. This variance in pressure enables portions of blank 12 trapped between bottom wall 68 of die 44 and floor 28 of mold cavity 18 to flow, thereby relieving stress concentrations that develop in blank 12 as a result of drawing blank 12 between female die 14 and draw ring 16. The use of first die 44 to pre-form a compartment in mold cavity 18 is illustrated in FIGS. 2 and 3, while the use of a second die 46 to finish-form the compartment is illustrated in FIG. 4.

At the beginning of each mold cycle, a first compartment-former comprising the first and second dies 44, 46 and each second compartment-former comprising a matched set of third and fourth dies 48, 50 is positioned above a blank 12 held by draw ring 16 against drawing surfaces 24, 26 of underlying female die 14 as shown in FIG. 2. Initially, the drive cam 54 and timing cam 82 have their timing marks aligned at the top center position indicating that draw ring 16 and blank 12 are in position to be formed. Valve 72 is set by limit switch means 84 to admit pressurized air from supply 71 into cylinder bore 64 to project first die 44 to its leading position relative to the second die. Third die 48 is suspended in its leading position relative to fourth die 50 using connecting spring means 51. Thus, a bottom wall 90 of each third die 48 and a bottom wall 60 of the first die 44 are positioned and aligned in substantially coplanar relation.

The multi-compartmented tray is pre-formed in blank 12 in the following manner. Drive cam 54 and ram 52 cooperate to lower press platen 40 and dies 44, 46, 48, and 50 carried thereon into draw ring 16 and toward the female die 14 during an initial stage of each molding cycle. Downward movement of platen 40 (indicated by the solid double arrow) causes the first die 44 and the third dies 48 to engage paperboard blank 12 substantially simultaneously and advance paperboard stock into the mold cavities 18, 20. This pre-loading operation continues until cam lobe 86 is rotated to activate limit switch means 84 and provide the actuation instruction to valve 72. As described above, such instruction causes valve 72 to vent pressure in cylinder bore 64 to the atmosphere to allow pistons 66 to move freely in die chamber 62. Movement of blank 12 relative to mold cavity 18 is not substantially hindered since biasing force is not being exerted against piston 66 by air in cylinder bore 64 to force first die 44 against the underlying blank 12. In preferred embodiments, only the weight of piston 66 applies a load to blank 12.

The multi-compartmented tray is finish-formed in the already pre-formed blank 12 in the following manner. Further downward movement of platen 40 (indicated by the dotted line double arrow) causes second die 46 and each of fourth dies 50 to move relative to the seated first and third dies 44, 48 into finish-forming engagement with side wall 30 and a portion of bottom wall 28 of each corresponding mold cavity. Thus, finish-forming occurs in each of mold cavities 18, 20 at substantially the same time. However, such movement of second die 46 does not act to push first die 44 against bottom wall 28. On the contrary, first die 44 is free to move away from its corresponding bottom wall 28 during the finish-forming step. This permits underlying portions of blank 12 to flow in a radially-outward direction toward drawing surfaces 24, 26 of mold cavity 18. Such flow permits sheet material of blank 12 to move toward regions under stress to relieve such stress and reduce the likelihood of rupture, tearing, or other damage to the tray during formation of the compartments therein.

Although the invention has been described in detail with reference to certain preferred embodiments, variations and modifications exist within the scope and spirit of the invention as described and as defined in the following claims.

What is claimed is:

1. A die set for forming a multi-compartmented tray from sheet material, the die set comprising
a female die assembly formed to include at least two mold cavities and a drawing surface bounding said mold cavities and providing common drawing regions between adjacent mold cavities,
first compartment-former means for pressing sheet material into a selected mold cavity to form a compartment therein, the first compartment-former means including a first die for pre-forming the compartment, a second die for finish-forming the compartment, projection means for moving the first die relative to the second die in a direction toward the selected mold cavity from an initial position to a pre-forming position leading the second die into the selected mold cavity during pre-forming of the compartment therein, and control means for disabling the projection means at a predetermined position of the first die in the selected mold cavity to permit relative movement between the leading first die and the trailing second die during finish-forming of the compartment in the selected mold cavity, second compartment former means for pressing sheet material into the remaining mold cavities to form compartments therein, and draw ring means for holding sheet material against said drawing surface during movement of the first and second compartment-former means into their respective mold cavities.

2. The die set of claim 1, wherein the first die applies a pre-forming force to a portion of the sheet material intermediate the first die and the selected mold cavity as sheet material is advanced into the selected mold cavity during operation of the projection means, and the control means acts to release the pre-forming force generated by the projection means and applied by the first die so that said portion of sheet material is allowed to flow toward said drawing surface during drawing operations occurring in finish-forming the compartment in the selected mold cavity.

3. The die set of claim 1, wherein the draw ring means is configured to grip the sheet material to be formed at the gripping region surrounding each mold cavity during operation of the first and second compartment-former means.

4. The die set of claim 1, wherein the first and second compartment-former means are arranged in aligned relation so that the first and second compartment-former means substantially simultaneously engage the sheet material to be formed during formation of the multi-compartmented tray.

5. The die set of claim 1, wherein the second die is formed to include a pressurizable piston chamber, and the projection means includes means for pressurizing the piston chamber and piston means for using pressure in excess of a predetermined amount in the piston chamber to apply a predetermined force to the first die, thereby moving the first die in relation to the second die to its pre-forming position.

6. The die set of claim 5, wherein each mold cavity has a floor, the first die has a bottom wall for pressing sheet material against a portion of the selected mold cavity, and the control means includes position-sensing means for indicating arrival of the bottom wall of the leading first die at about the floor of the selected mold cavity during movement of the first compartment-former means into the selected mold cavity to define the predetermined position of the first die, and valve means for depressurizing the piston chamber to reduce pressure in the piston chamber below said predetermined amount in response to an indication from the position-sensing means that the leading first die has arrived and stopped at its predetermined position so that continued movement of the first compartment-former means into the selected mold cavity causes the trailing second die to move in relation to the substantially stationary first die toward mating engagement with the selected mold cavity in the absence of the applied predetermined force generated by the projection means.

7. The die set of claim 6, wherein the first compartment-former means further includes a drive cam, the position-sensing means includes a timing cam coupled to the drive cam and having timing mark means for indicating arrival of the leading first die at the predetermined position, and the valve means includes a valve for selectively venting the piston chamber to reduce pressure therein below the predetermined amount and limit switch means for reading the timing mark means to activate the valve.

8. The die set of claim 6, wherein the valve means includes a vent valve connecting the chamber to the means for pressurizing the piston chamber and means for activating the vent valve in response to an indication provided by the position-sensing means to reduce pressure in the piston chamber below the predetermined amount.

9. The die set of claim 1, wherein the second compartment-former means includes a male die assembly corresponding to each of said remaining mold cavities, each male die assembly including a third die for pre-forming a corresponding compartment, a fourth die for finish-forming the corresponding compartment, and spring means for yieldably coupling the third and fourth dies to one another causing the third die to be yieldably urged to a projected position leading the fourth die into the corresponding mold cavity so that movement of each male die assembly into a stationary a companion mold cavity causes the moving third die to mate with the stationary companion mold cavity and preform another compartment in the tray before the fourth die mates with the companion mold cavity and also causes the fourth die to continue to move in relation to the stationary mated third die to mate with the stationary companion mold cavity and finish-form said another compartment due to the yieldable coupling established by the spring means.

10. A die set for forming a multi-compartmented tray from sheet material, the die set comprising male die means, a female die assembly formed to include at least two mold cavities, each mold cavity having a floor and a side wall, and upstanding ridges separating adjacent mold cavities, each upstanding ridge having an outer surface facing the male die means and a border region surrounding the at least two mold cavities and facing the male die means, the outer surfaces of the upstanding ridges and the border region cooperating to define first draw pad means, said male die means including at least two compartment-formers for pressing sheet material into companion mold cavities to form compartments in the sheet material and drive means for moving the at least two compartment-formers into their companion mold cavities, one of the compartment-formers including a first die portion having a leading pad for pre-forming a selected compartment, and a second die portion having a trailing pad for finish-forming the selected compartment, second draw pad means for holding sheet material against the first draw pad means to provide a predetermined tension on the material in a drawing process occurring during movement of the compartment-formers against the sheet material and subsequently into the mold cavities, bias means for moving the first die portion relative to the second die portion to a lead position to project the leading pad toward a selected mold cavity corresponding to the first compartment-former so that movement of the first compartment-former into the selected mold cavity causes the leading pad to pre-form the selected compartment by pressing sheet material against the floor of the selected mold cavity before the trailing pad finish-forms the selected compartment by drawing sheet material between the first and second draw pad means and pressing sheet material against the side wall of the selected mold cavity, and control means for disabling the bias means at a predetermined position of the first die portion in the selected mold cavity, thereby permitting the second die portion to move relative to the first die portion during continued movement of the first compartment-former into the selected mold cavity and relieving pressure exerted on sheet material trapped intermediate the lead pad and the floor of the selected mold cavity due to operation of the biasing means so that such trapped sheet material can flow between the lead pad and the floor of the selected mold cavity without tearing as additional sheet material is drawn between the first and second draw pad means during formation of the compartments.

11. The die set of claim 10, wherein each of the compartment-formers substantially simultaneously engage the sheet material to be formed during operation of the drive means.

12. The die set of claim 10, wherein the first die portion includes a bottom wall providing the leading pad and the second die portion includes a side wall providing at least a portion of the trailing pad.

13. The die set of claim 10, wherein the bias means includes actuating means for continuously applying a predetermined force to the first die portion to move the first die portion to its lead position.

14. The die set of claim 13, wherein the second die portion is formed to include a pressurizable piston chamber, and the actuating means includes means for pressurizing the piston chamber and piston means for using pressure in excess of a predetermined amount in the piston chamber to apply a predetermined force to the first die.

15. The die set of claim 13, wherein the control means includes indicating means for sensing the position of the first die portion relative to the selected mold cavity to indicate mating of the leading pad and the floor of the selected mold cavity and valve means for withdrawing the predetermined force applied to the first die portion by the actuating means in response to an instruction from the indicating means.

16. The die set of claim 15, wherein the male die means further includes a drive cam, the indicating means includes a timing cam coupled to the drive cam and having timing mark means for indicating arrival of the leading pad of the first die portion in mating engagement with the floor of the selected mold cavity, and the valve means includes a valve for selectively venting the pressure means to produce pressure therein below the predetermined amount and limit switch means for reading the timing mark means to activate the valve.

17. In a die set for forming a multi-compartmented tray from sheet material, the die set including a female die assembly formed to include at least two mold cavities, male die means for pressing sheet material into the mold cavities, the male die means including means for forming a first compartment. means for forming at least one second compartment, drive means for moving the first and second compartment-forming means into their respective mold cavities, and draw ring means for gripping the sheet material to be formed at gripping regions adjacent each mold cavity during operation of the first and second compartment-forming means to provide a predetermined tension on the sheet material during the drawing process, an improved first compartment-forming means comprising a first die having a bottom wall for pressing sheet material against a mold portion defining a selected mold cavity corresponding to the first compartment-forming means, a second die having an outer wall for pressing sheet material against a mold portion defining a remaining portion of the selected mold cavity and an inner wall defining a die chamber for slidably receiving the first die, projection means for applying a predetermined force to the first die to project the bottom wall of the first die past the outer wall of the second die from an initial position to a lead position so that movement of the first compartment-forming means into the selected mold cavity causes the bottom wall to advance sheet material into the selected mold cavity before the outer wall of the second die presses sheet material against a remaining portion of the mold defining the selected mold cavity, and control means for disabling the projection means at a predetermined position of the first die in the selected mold cavity to withdraw application of the predetermined force to the first die, thereby permitting sheet material intermediate the bottom wall of the first die and the selected mold cavity to flow therebetween as sheet material is subsequently formed between the outer wall of the second die and the selected mold cavity so that sheet material pressed into the female die assembly remains substantially intact and untorn during formation of the compartments.

18. The improvement of claim 17, wherein the draw ring means is configured to define gripping regions surrounding the entire periphery of each mold cavity.

19. The die set of claim 1, wherein the female die assembly includes a drawing surface bounding said mold cavities and providing common drawing regions between each adjacent pair of mold cavities, and the draw ring means is configured to hold sheet material against said drawing surface during movement of the first compartment-former means into the selected mold cavity and movement of the second compartment-former means into the remaining mold cavities.

20. The improvement of claim 17, further comprising stop means for limiting sliding movement of the first die in the die chamber relative to the second die to retain the first die in its lead position during operation of projection means.

21. The improvement of claim 17, wherein the first die is freely slidable in the die chamber between its initial and lead positions during diablement of the projection means to allow sheet material to flow between the bottom wall of the first die and the mold cavity during the drawing process.

22. The improvement of claim 17, wherein the second die is formed to include a pressurizable piston chamber, the projection means includes means for pressurizing the piston chamber and piston means for using pressure in excess of a predetermined amount in the piston chamber to apply the predetermined force to the first die, thereby moving the first die in relation to the second die to its lead position.

23. The improvement of claim 22, wherein the projection means further includes valve means for venting the piston chamber to reduce the pressure therein below a threshold amount upon arrival of the first die at the predetermined position to permit relative movement between the first and second dies.

* * * * *

UNITED STATES PATENT AND TRADEMARK OFFICE
CERTIFICATE OF CORRECTION

PATENT NO. : 4,690,666

DATED : September 1, 1987

INVENTOR(S) : Garold W. Alexander et al

It is certified that error appears in the above-identified patent and that said Letters Patent is hereby corrected as shown below:

At column 4, line 4, please delete "18" and insert therefor --16--;

At column 4, line 7, please delete "surf aces" and insert therefor --surfaces--;

At column 4, line 35, please delete "18" and insert therefor --16--;

At column 4, line 65, please delete "76" and insert therefor --78--;

At column 5, line 18, please delete "48" and insert therefor --46--; and

Signed and Sealed this

Twelfth Day of April, 1988

Attest:

DONALD J. QUIGG

Attesting Officer

Commissioner of Patents and Trademarks